United States Patent [19]
Saitou et al.

[11] Patent Number: 5,559,655
[45] Date of Patent: *Sep. 24, 1996

[54] GUIDE ROLLERS FOR A TAPE DRIVING BELT IN A DATA STORAGE CARTRIDGE

[75] Inventors: Kengo Saitou; Kazuo Sasaki; Taizo Aizawa, all of Miyagi, Japan

[73] Assignee: Sony Corporation, Tokyo, Japan

[ * ] Notice: The term of this patent shall not extend beyond the expiration date of Pat. No. 5,416,659.

[21] Appl. No.: 535,350

[22] Filed: Sep. 28, 1995

Related U.S. Application Data

[63] Continuation of Ser. No. 411,587, Mar. 29, 1995, Pat. No. 5,515,216, which is a continuation of Ser. No. 123,171, Sep. 20, 1993, Pat. No. 5,416,659.

[30] Foreign Application Priority Data

Sep. 25, 1992 [JP] Japan .................... 4-279316
Sep. 25, 1992 [JP] Japan .................... 4-279320

[51] Int. Cl.⁶ .................... G11B 23/087
[52] U.S. Cl. .................... 360/132
[58] Field of Search .................... 360/132; 242/352.4

[56] References Cited

U.S. PATENT DOCUMENTS

4,635,155  1/1987  Georgens et al. .................... 360/132
5,416,659  5/1995  Saitou et al. .................... 360/132

*Primary Examiner*—Robert S. Tupper
*Attorney, Agent, or Firm*—William S. Frommer; Alvin Sinderbrand

[57] ABSTRACT

The present invention provides a data cartridge having a cartridge case (1) capable of containing either of two kinds of magnetic tapes differing from each other in width. The data cartridge is provided with a pair of guide rollers (8) for guiding a driving belt ((9) for driving a magnetic tape (5). Each guide roller (8) has a crowned working surface (8a) having a maximum portion having a maximum diameter. The maximum portion is dislocated from a position corresponding to the middle between the opposite ends of the guide roller (8) toward one of the opposite ends by a specific distance. Each guide roller (8) is set in a position in which the maximum portion is below the position corresponding to the middle between the opposite ends when the data cartridge is provided with a first magnetic tape (¼ in. magnetic tape) or in a position in which the maximum portion is above the position corresponding to the middle between the opposite ends when the data cartridge is provided with a second magnetic tape (8 mm magnetic tape) having a width greater than that of the first magnetic tape.

3 Claims, 9 Drawing Sheets

GUIDE ROLLERS FOR A TAPE DRIVING BELT IN A DATA STORAGE CARTRIDGE

This application is a continuation of application Ser. No. 08/411,587, filed Mar. 29, 1995, U.S. Pat. No. 5,515,216, which was, in turn, a continuation of application Ser. No. 08/123,171, filed Sep. 20, 1993, U.S. Pat. No. 5,416,659 on May 16, 1995.

BACKGROUND OF THE INVENTION

1. Field of the Invention

The present invention relates to a data storage cartridge suitable for use as a back-up memory for storing data in a high recording density in, for example, a CPU (central processing unit).

2. Description of the Related Art

A data storage cartridge serving as a back-up memory for storing data in a high recording density in a CPU is disclosed in Japanese Patent Publication (Kokoku) No. 52-14976.

As shown in FIGS. 5 to 9, a data storage cartridge of this kind has a cartridge case 1 formed by fastening a case body 3. i.e., an upper half case, formed of a transparent synthetic resin in the shape of a shallow box to a base plate 2, i.e., a lower half case, formed of aluminum or a synthetic resin in the shape of a flat plate with screws. A pair of tape reels 4 having each a pair of flanges 4a and 4b and formed of a synthetic resin, such as a PC resin, are supported for rotation on the base plate 2, and a magnetic tape 5 is held on the pair of tape reels 4 so as to extend between the pair of tape reels 4.

Figure 5:
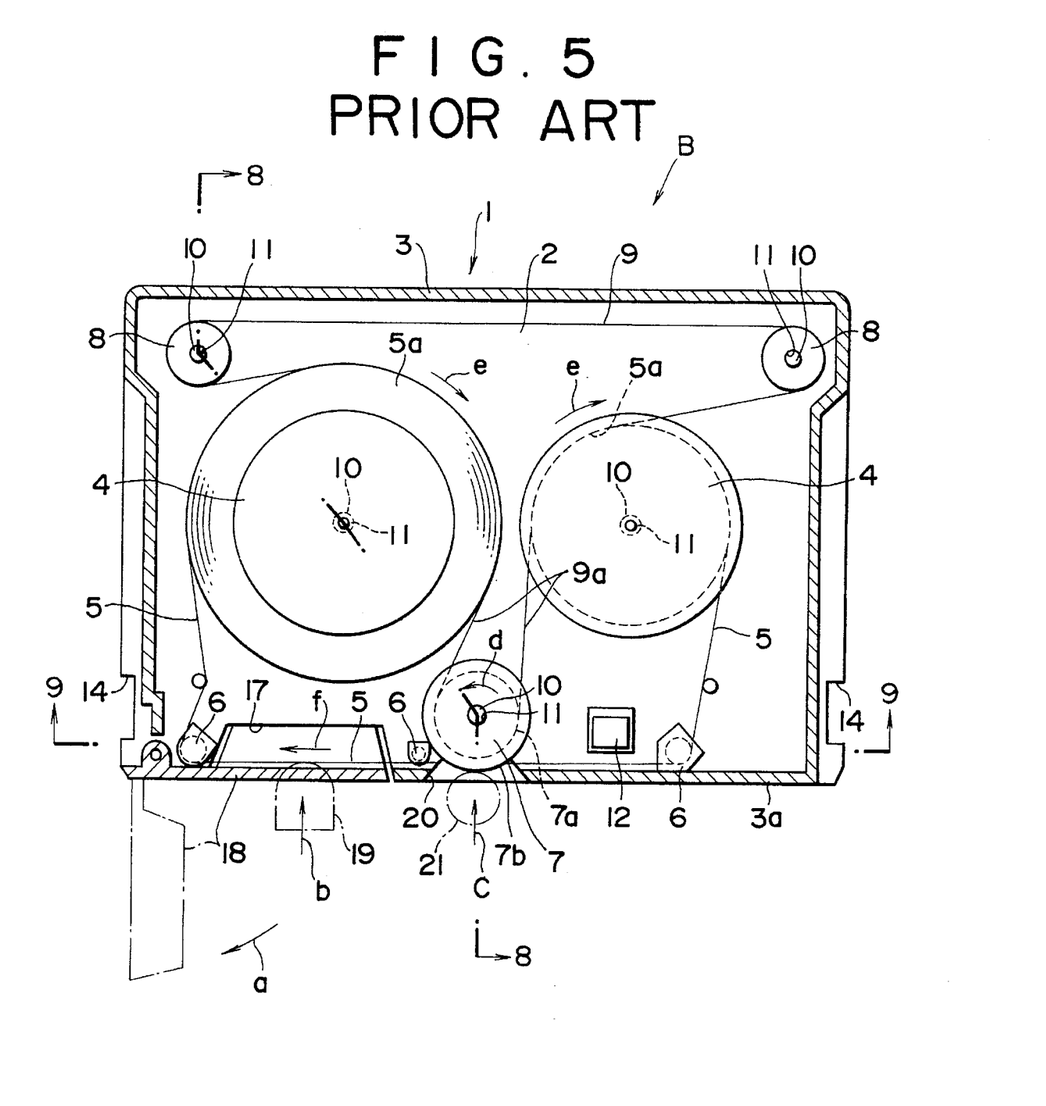
FIG. 5 is a partly cutaway plan view of a known data cartridge.

The magnetic tape 5 is guided by three flanged tape guides 6 so as to extend along the inner surface of the front wall 3a of the case body 3. A driving roller 7 formed of a synthetic resin is supported for rotation on the base plate 2 substantially at the middle of the front side of the base plate 2, and a pair of guide rollers 8 are supported for rotation on the base plate 2 in the opposite rear corners of the base plate 2. An elastic driving belt 9, such as a rubber belt, is wound tautly around the driving roller 7 and the pair of guide rollers 8 so as to extend along a substantially T-shaped path. Driving portions 9a of the driving belt 9, extending between the driving roller 7 and the guide rollers 8 are in pressure-contact with the circumferences of the coils 5a of the magnetic tape 5 wound on the tape reels 4, respectively.

The pair of tape reels 4, the driving roller 7 and the pair of guide rollers 8 are supported for rotation respectively on support shafts 10 of a metal or the like fixedly set in an upright position on the base plate 2 by press-fitting or the like and closely received in the center holes 11 of the tape reels 4, the driving roller 7 and the guide rollers 8. A mirror 12 for the optical detection of the tape ends of the magnetic tape 5 is disposed behind the front portion of a tape path along which the magnetic tape 5 travels.

Figure 8:
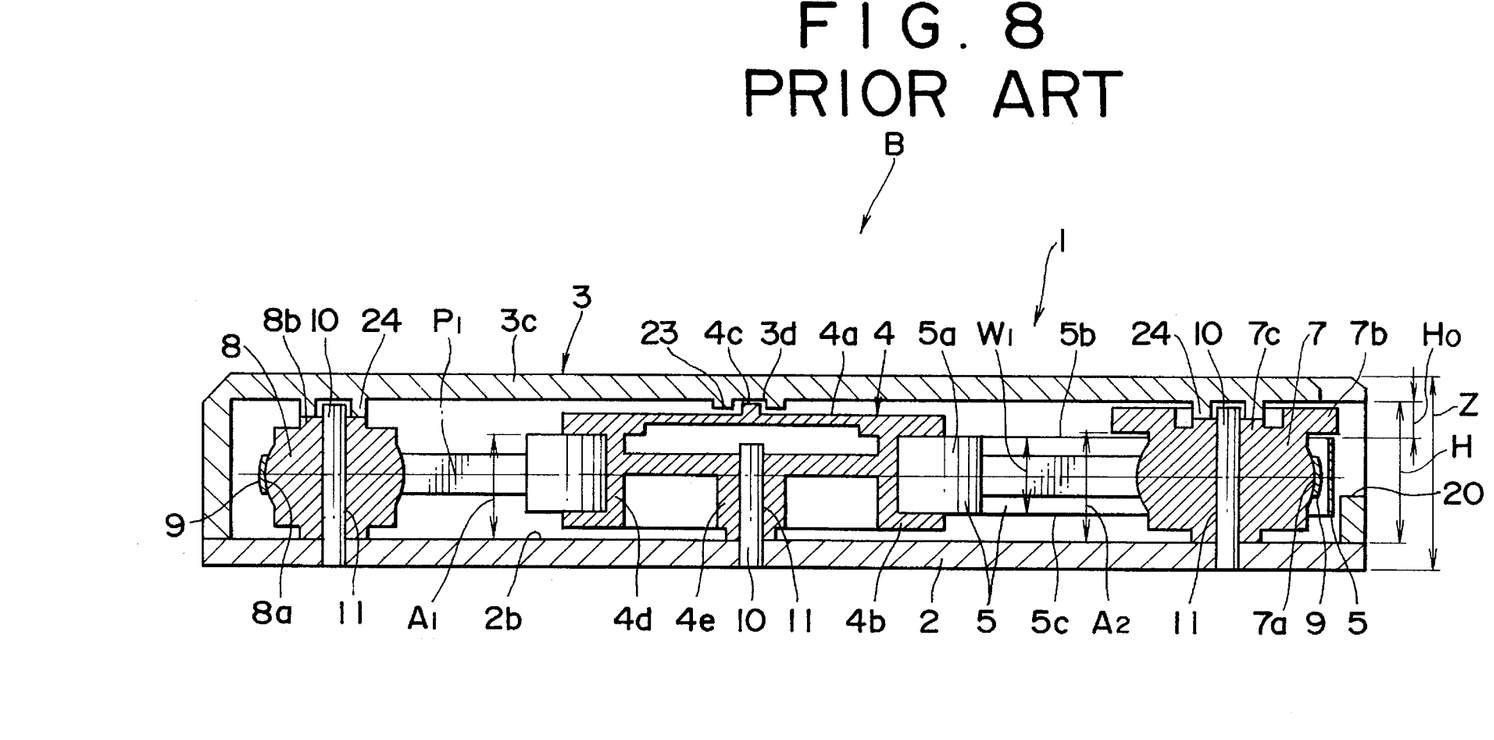
FIG. 8 is a sectional view taken on line D—D in FIG. 5.
Figure 9:
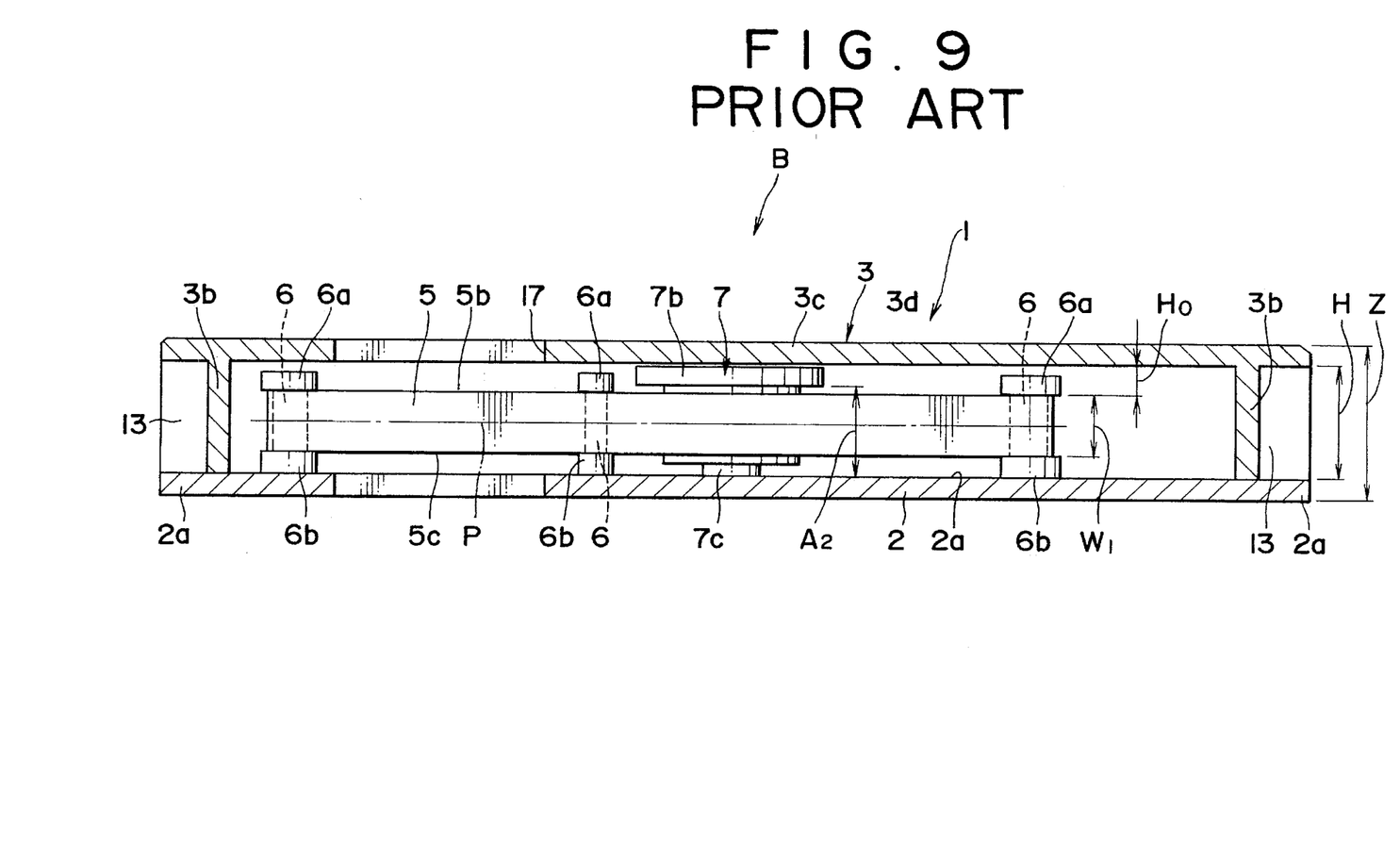
FIG. 9 is a sectional view taken on line E—E in FIG. 5.

The upper flange 4a of each tape reel 4 is provided integrally and coaxially with a pivot 4c on the upper surface thereof. The lower flange 4b of each tape reel 4 is provided integrally and coaxially with a hub 4d on the upper surface thereof, and the hub 4d is provided integrally and coaxially with a cylindrical boss 4e. The driving roller 7 and the guide rollers 8 are formed of a POM resin or the like and have crowned working surfaces 7a and 8a for stabilizing the driving belt 9 thereon, respectively. The driving roller 7 is provided integrally with an upper flange 7b at its upper end, and cylindrical bosses 7c respectively on its upper and lower ends. Each guide roller 8 is provided integrally with bosses 8b respectively on its upper and lower ends. Each tape guide 6 is provided integrally with an upper flange 6a and a lower flange 6b to maintain the magnetic tape 5 on a fixed level.

The magnetic tape 5 is wound on the hub 4d of each tape reel 4 between the upper flange 4a and the lower flange 4b. The magnetic tape 5 travels along the barrel between an upper flange 6a and a lower flange 6b of each of the three tape guides 6. The driving belt 9 is wound round the respective crowned working surfaces 7a and 8a of the driving roller 7 and the guide rollers 8. Thus, the magnetic tape 5 and the driving belt 9 are extended with their center lines included in a plane $P_1$.

Figure 6:
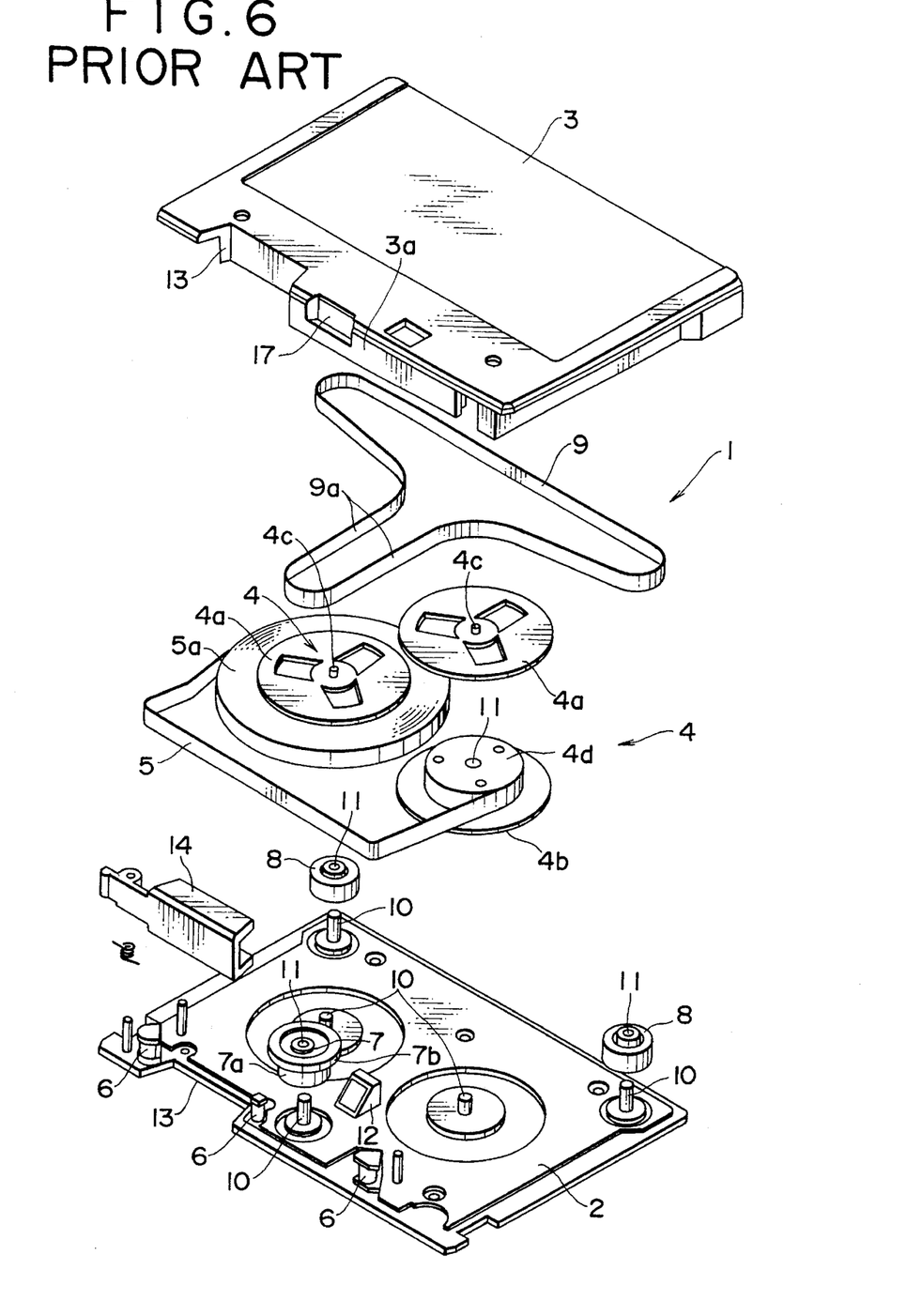
FIG. 6 is a perspective view of the data cartridge of FIG. 5.
Figure 7:
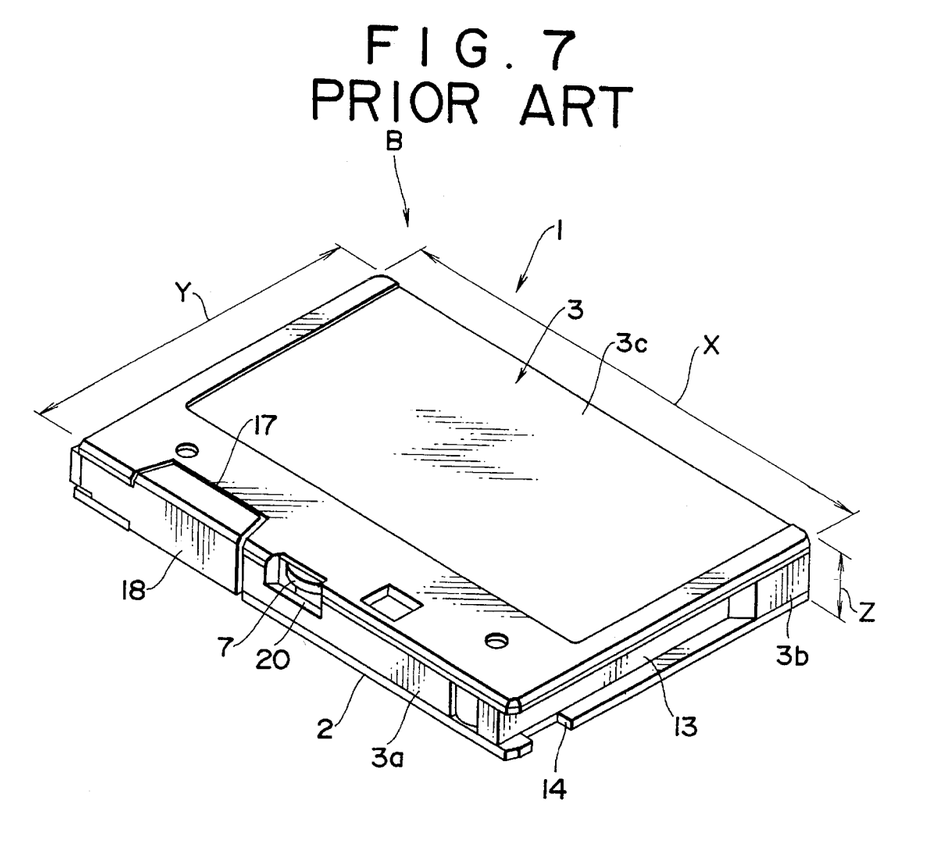
FIG. 7 is a perspective view of the data cartridge of FIG. 5.

The opposite side walls 3b of the case body 3 are recessed slightly to form a pair of parallel side grooves 13. Front portions of the opposite side edges 2a of the base plate 2 are recessed to form positioning recesses 14.

Referring to FIG. 5, when the data cartridge is inserted in a recording/reproducing apparatus, a lid 18 disposed between the base plate 2 and the case body 3 so as to cover a recess 17 formed in the front edges of the base plate 2 and the case body 3 on one side of the driving roller 7 is turned in the direction of the arrow a, and then a magnetic head 19 included in the recording/reproducing apparatus is advanced in the direction of the arrow b into the recess 17 so as to come into contact with the magnetic tape 5. At the same time, a motor, not shown, included in the recording/reproducing apparatus is actuated to advance a friction roller 21, such as a rubber roller, in the direction of the arrow c through an opening 20 formed in the front wall 3a of the case body 3 at a position corresponding to the driving roller 7 so that the friction roller 21 is pressed against the upper flange 7b of the driving roller 7. Then, the friction roller 21 drives the driving roller 7 for rotation in the direction of the arrow d to turn the driving belt 9 in the direction of the arrow e and, consequently, the driving portions 9a of the driving belt 9 in contact with the coils 5a of the magnetic tape 5 drive the tape reels 4 for rotation in the direction of the arrow e. Consequently, the magnetic tape 5 travels in the direction of the arrow f at a high speed in the range of 25 to 120 in./sec, while data provided by the CPU is recorded on or recorded data is reproduced from the magnetic tape 5 with the magnetic head 15.

As shown in FIGS. 8 and 9, the pivots 4c of the tape reels 4 are pressed against the lower surface 3d of the upper wall 3c of the case body 3 by the resilience of the upper flanges 4a so that the lower end of the bosses 4e of the tape reels 4 are pressed against the upper surface 2b of the base plate 2. The extremities of the pivots 4c are fitted respectively in positioning holes defined by cylindrical projections 23 formed integrally with the upper wall 3c of the case body 3. Three cylindrical projections 24 formed on the lower surface of the upper wall 3c of the case body 3 integrally with the upper wall 3c are in contact with the upper ends of the respective upper bosses 7c and 8b of the driving roller 7 and the guide rollers 8 to hold the lower ends of the respective lower bosses 7c and 8b of the driving roller 7 and the guide rollers 8 in contact with the upper surface 2b of the base plate 2.

Since the tape reels 4, the driving roller and the two guide rollers 8 are thus biased toward the base plate 2 in the cartridge case 1, the thickness H of the internal space of the cartridge case 1 is not utilized effectively, and the distance $A_1$ (FIG. 8) between the lower surface of the upper flange 4a of each tape reel 4 and the upper surface of the base plate 2, which limits the width $W_1$ of the magnetic tape 5, and the distance $A_2$ between the lower surface of the flange 7b of the driving roller 7 and the upper surface of the base plate 2 are limited to comparatively small values. Therefore, it has been impossible to use the cartridge case 1 thus constructed for containing a magnetic tape having a width greater than ¼ in. and the magnetic tape 5 of only ¼ in. in width $W_1$ has a comparatively small recording capacity.

Incidentally, data cartridges of this kind are classified as either standard S-type data cartridges, i.e., data cartridges having a smaller standard size, or as standard L-type data cartridges, i.e., data cartridges having a larger standard size, and both the standard S-type data cartridges and the standard L-type data cartridges are designed for magnetic tapes of ¼ in. in width.

The dimensions X, Y and Z indicated in FIG. 7 of the standard data cartridges are standardized. For S-type data cartridges, X=80.98 mm, Y=61.11 mm and Z=14.73 mm, and for L-type data cartridges, X=152.4 mm, Y=101.6 mm and Z =17.15 mm.

The inventors of the present invention intended to enable the cartridge case 1 to contain a magnetic tape having a width greater than the width $W_1$ of the magnetic tape 5 and a recording capacity greater than the magnetic tape 5 without changing the dimension Z of the cartridge case 1, by utilizing a space of a thickness $H_0$ (FIG. 8) extending between the lower surface 3d of the upper wall 3c of the case body 3 and the upper edge 5b of the magnetic tape 5 for containing an upper portion of a magnetic tape having a width greater than the width $W_1$ of the magnetic tape 5.

When a magnetic tape having a width greater than the width $W_1$ of the magnetic tape 5 is contained in the cartridge case 1, the plane $P_1$ including the respective center lines of the magnetic tape and the driving belt 9 must be shifted toward the upper wall 3c of the case body 3, and the center lines of the crowned working surfaces 7a and 8a of the driving roller 7 and the guide rollers 8 must be shifted accordingly toward the upper wall 3c of the case body 3.

Accordingly, the driving roller 7 and the guide rollers 8 for a data cartridge for containing a magnetic tape of one specific width and those for a data cartridge for containing a magnetic tape of another specific width differ from each other in dimensions and, consequently, a driving roller 7 and guide rollers 8 of certain dimensions cannot be commonly used for those cartridge cases for containing magnetic tapes having different widths, respectively, which has been a first problem to be solved.

A second problem in the known data cartridges containing a magnetic tape of ¼ in. width has been that the magnetic tape of ¼ in. in width has a comparatively small recording capacity.

SUMMARY OF THE INVENTION

Accordingly, a first object of the present invention intended to solve the first problem is to provide two kinds of data cartridges respectively containing two kinds of magnetic tapes differing from each other in width, and provided respectively with guide rollers of the same size for guiding a driving belt.

A second object of the present invention intended to solve the second problem is to provide a data cartridge of the same overall dimensions as those of the standard data cartridge, capable of containing a magnetic tape having a width greater than the width of the standard magnetic tape.

A data cartridge embodying as aspect of the present invention and intended to achieve the first object of the invention comprises a cartridge case consisting of a base plate and a case body, a pair of tape reels supported for rotation within the cartridge case, a driving roller, a pair of guide rollers, a magnetic tape held on the pair of tape reels, and a driving belt wound around the driving roller and the pair of guide rollers so as to extend along a substantially T-Shaped path, having driving portions pressed respectively against the circumferences of coils of the magnetic tape held on the pair of tape reels and driven by the driving roller, wherein the working surface of each of the pair of guide rollers is crowned so that a portion having a maximum diameter of the crowned working surface is dislocated from a position corresponding to the middle between the opposite ends of the guide roller toward one of the opposite ends, each guide roller is disposed with one end up and the other end down when the magnetic tape has a first width or with the former end down and the latter end up when the magnetic tape has a second width different from the first width in order that the portion having a maximum diameter of the crowned working surface of each guide roller coincides with the center line of the magnetic tape.

A data cartridge embodying another aspect of the present invention and intended to achieve the second object of the invention comprises a cartridge case consisting of a base plate and a case body, a pair of tape reels supported for rotation within the cartridge case, a magnetic tape held on the pair of tape reels, a driving roller, a pair of guide rollers, and a driving belt wound around the driving roller and the pair of guide rollers along a substantially T-shaped path, having driving portions pressed respectively against the circumferences of coils of the magnetic tape held on the pair of tape reels and driven by the driving roller, wherein at least the upper flange of each of the pair of tape reels is fitted in a recess formed in the lower surface of the upper wall of the case body. Thus, the distance between the lower surface of the upper flange the tape reel and the upper surface of the lower flange the same, which corresponds substantially to the width of the magnetic tape, is greater than the distance between the corresponding portions of the tape reel of the known data cartridge of the same overall dimensions as those of the data cartridge of the present invention.

Desirably, the data cartridge of the present invention is constructed so as to contain a magnetic tape of 8 mm in width, which is greater than ¼ in..

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Preferred embodiments of the present invention will be described hereinafter with reference to FIGS. 1 to 4, in which parts like or corresponding to those described previously with reference to FIGS. 5 to 9 are denoted by the same reference characters and the description thereof will be omitted to avoid duplication.

The manner in which a pair of guide rollers 8 are set in the cartridge case of a data cartridge in a first embodiment according the the present invention when using a magnetic tape of a width $W_1$ of ¼ in. (¼ in. magnetic tape) and when using another magnetic tape of a width $W_2$ of 8 mm (8 mm magnetic tape) will be described with reference to FIGS. 1(B) and 1(A), respectively.

Figures 1A, 1B:
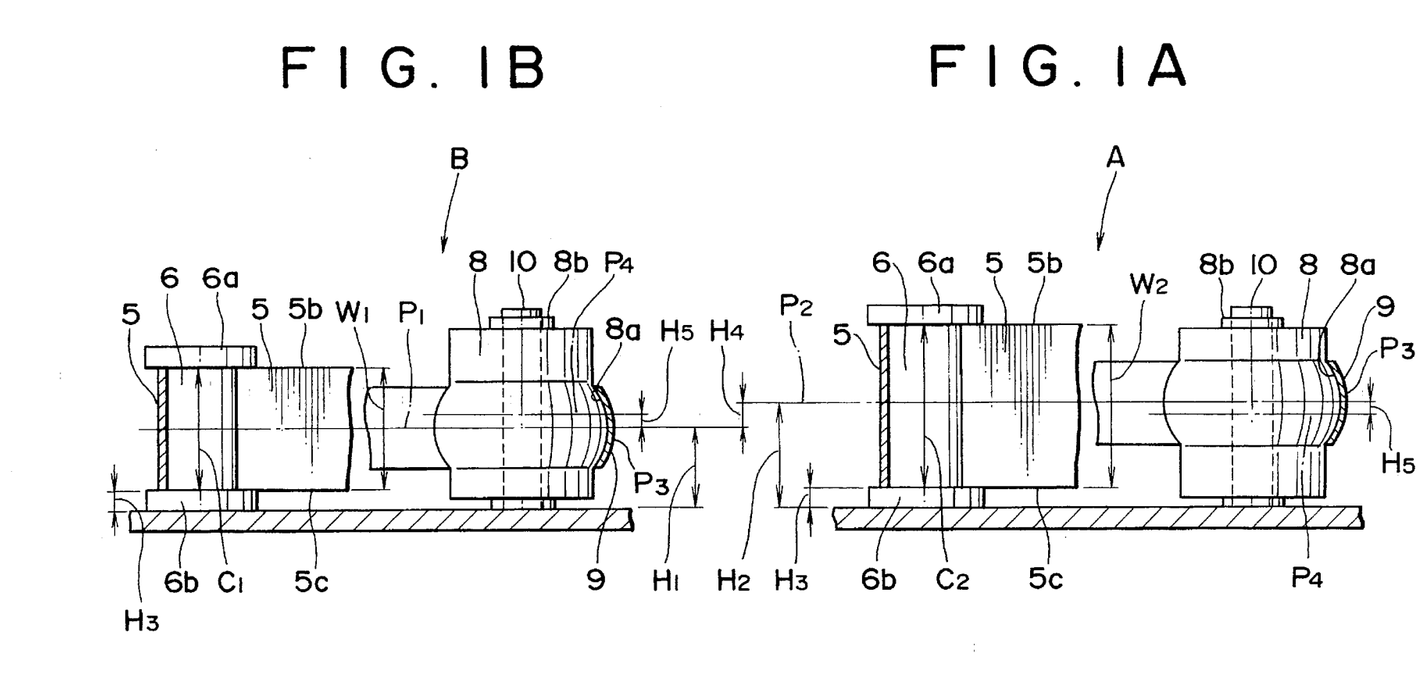
FIGS. 1(A) and 1(B) are fragmentary sectional views of an essential portion of a data cartridge according to an embodiment of the present invention, which corresponds to sectional views taken on line A—A in FIG. 4.

FIG. 1(A) shows a manner of setting a guide roller 8 in the cartridge case 1 of a data cartridge A provided with a 8 mm magnetic tape 5 having a width $W_2$ of 8 mm, and FIG. 1(B) shows a manner of setting the guide roller 8 in the cartridge case 1 of a data cartridge B provided with a ¼ in. magnetic tape 5 having a width $W_1$ of ¼ in. In FIGS. 1(A) and 1(B), $H_2$ is the height of the center line $P_2$ of the 8 mm magnetic tape 5 of the data cartridge A, and $H_1$ is the height of the center line $P_1$ of the ¼ in. magnetic tape 5 of the data cartridge B, respectively. The data cartridges A and B are provided with tape guides 6 of the same diametric dimensions. Denoted by $H_3$ is the height of the upper surface of the lower flange 6b, which corresponds to the height of the lower edges of the 8 mm magnetic tape 5 and the ¼ in. magnetic tape 5. Since the respective heights of the respective upper surfaces of the lower flanges 6b of the tape guides 6 of the data cartridges A and B are the same, $H_1 < H_2$. Denoted by $H_4$ is the difference between the heights $H_1$ and $H_2$, by $C_1$ is denoted the distance between the lower surface of the upper flange 6a and the upper surface of the lower flange 6b of the tape guide 6 of the data cartridge B, which corresponds to the width $W_1$ of the ¼ in. magnetic tape 5, and by $C_2$ is denoted the distance between the lower surface of the upper flange 6a and the upper surface of the lower flange 6b of the tape guide 6 of the data cartridge A, which corresponds to the width $W_2$ of the 8 mm magnetic tape 5.

In FIGS. 1(A) and 1(B), one and the same guide roller 8 is mounted for rotation on a shaft 10 in different orientations. The guide roller 8 has a crowned working surface 8a having a maximum portion $P_3$, namely, a portion having a maximum diameter, that deviates from a position corresponding to the middle between the opposite ends of the guide roller 8 toward one of the opposite ends of the same. When the guide roller 8 is set in a reverse position as shown in FIG. 1(A), the maximum portion $P_3$ of the guide roller 8 coincides with the center line P2 of the 8 mm magnetic tape 5. When the guide roller 8 is inverted and set in a normal position as shown in FIG. 1(B), the maximum portion $P_3$ of the guide roller coincides with the center line $P_1$ of the ¼ in. magnetic tape 5.

For example, when the guide roller 8 is set in the normal position for the data cartridge B provided with the ¼ in. magnetic tape 5 as shown in FIG. 1(B), the maximum portion $P_3$ of the crowned working surface 8a is located a distance $H_5$ below the position corresponding to the middle between the opposite ends of the guide roller 8. The distance $H_5$ is equal to ½ of the difference $H_4$ between the height $H_2$ of the center line $P_2$ of the 8 mm magnetic tape 5 and the height $H_1$ of the center line $P_1$ of the ¼ in. magnetic tape 5.

Thus, the same guide roller 8 can be set in either the data cartridge A or the data cartridge B with the maximum portion $P_3$ of the crowned working surface 8a coinciding with the 8 mm magnetic tape 5 or the ¼ in. magnetic tape 5, because the guide roller 8 can be set in the inverted position in the data cartridge A provided with the 8 mm magnetic tape 5 as shown in FIG. 1(A) or set in the normal position in the data cartridge B provided with the ¼ in. magnetic tape as shown in FIG. 1(B). Accordingly, the guide rollers 8 can be commonly applied to both the data cartridge A provided with the 8 mm magnetic tape 5 and the data cartridge B provided with the ¼ in. magnetic tape 5, which contributes to the reduction of the costs of the data cartridges A and B.

A data cartridge in a second embodiment according to the present invention will be described hereinafter with reference to FIGS. 2 to 4. The cartridge case 1 of the data cartridge in the second embodiment provided with an 8 mm magnetic tape, which corresponds to the data cartridge A, is the same in overall dimensions X, Y and Z as the data cartridge provided with the ¼ in. magnetic tape, which corresponds to the: data cartridge B.

Figure 2:
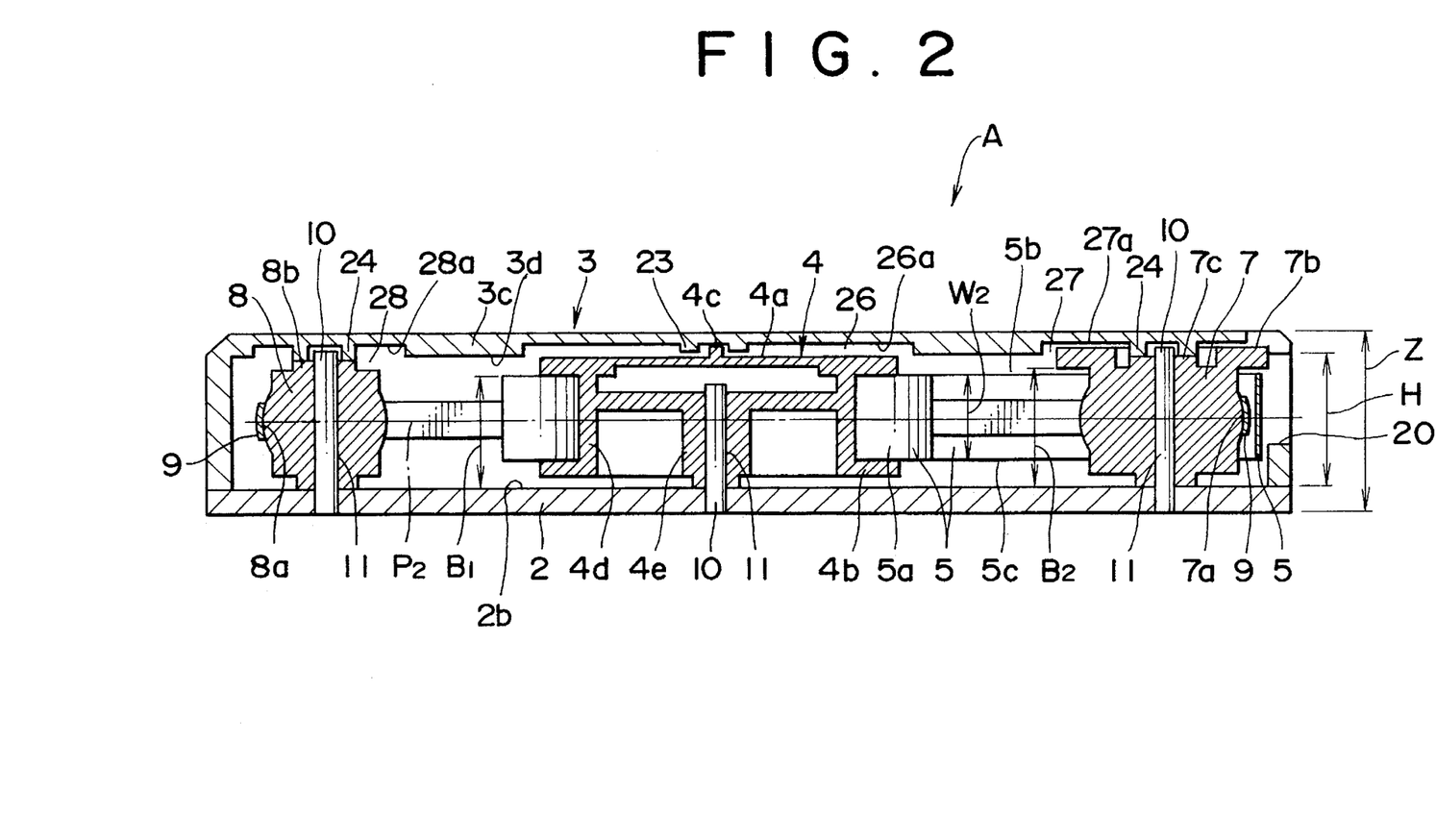
FIG. 2 is a sectional view taken on line B—B in FIG. 4.
Figure 3:
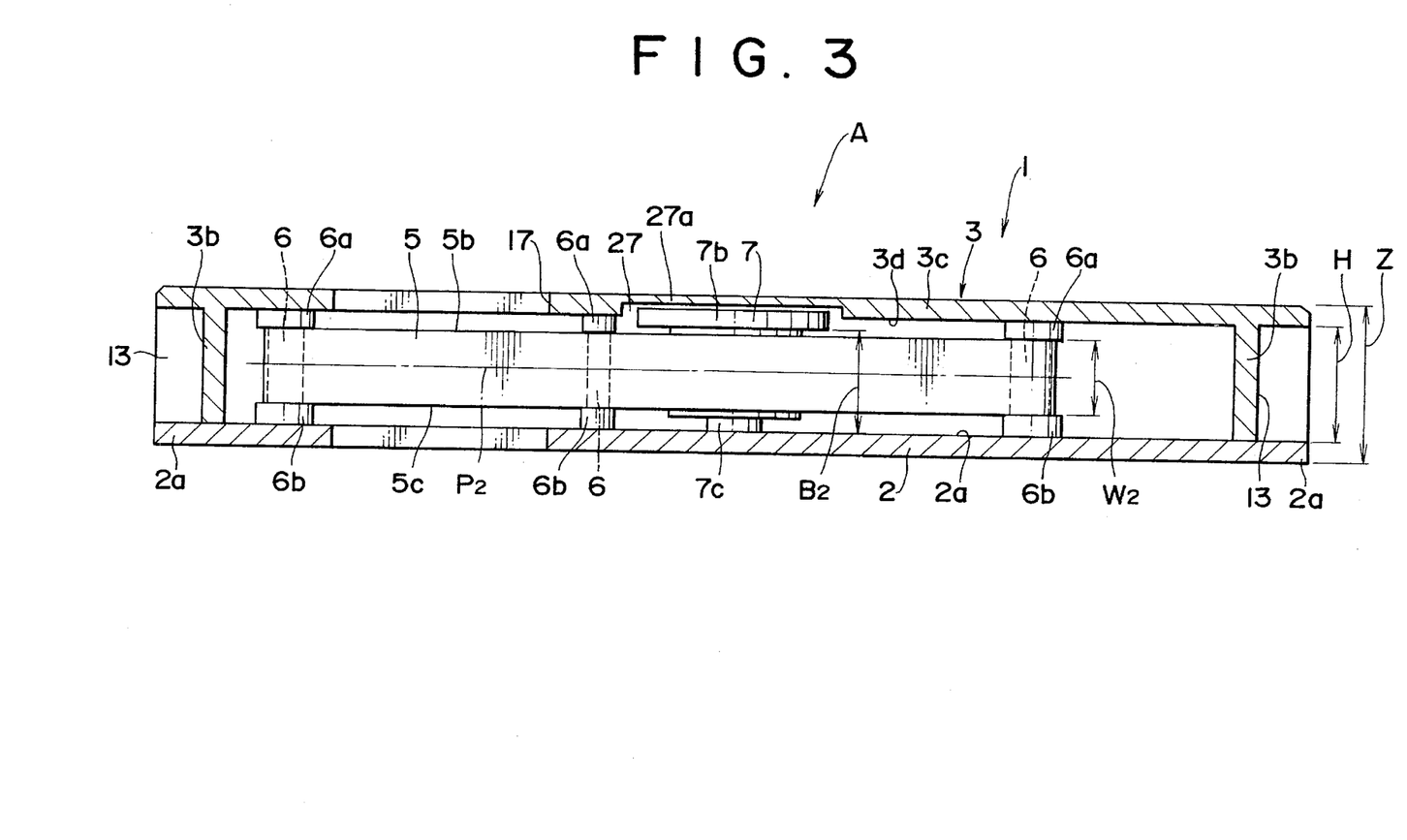
FIG. 3 is a sectional view taken on line C—C in FIG. 4.
Figure 4:
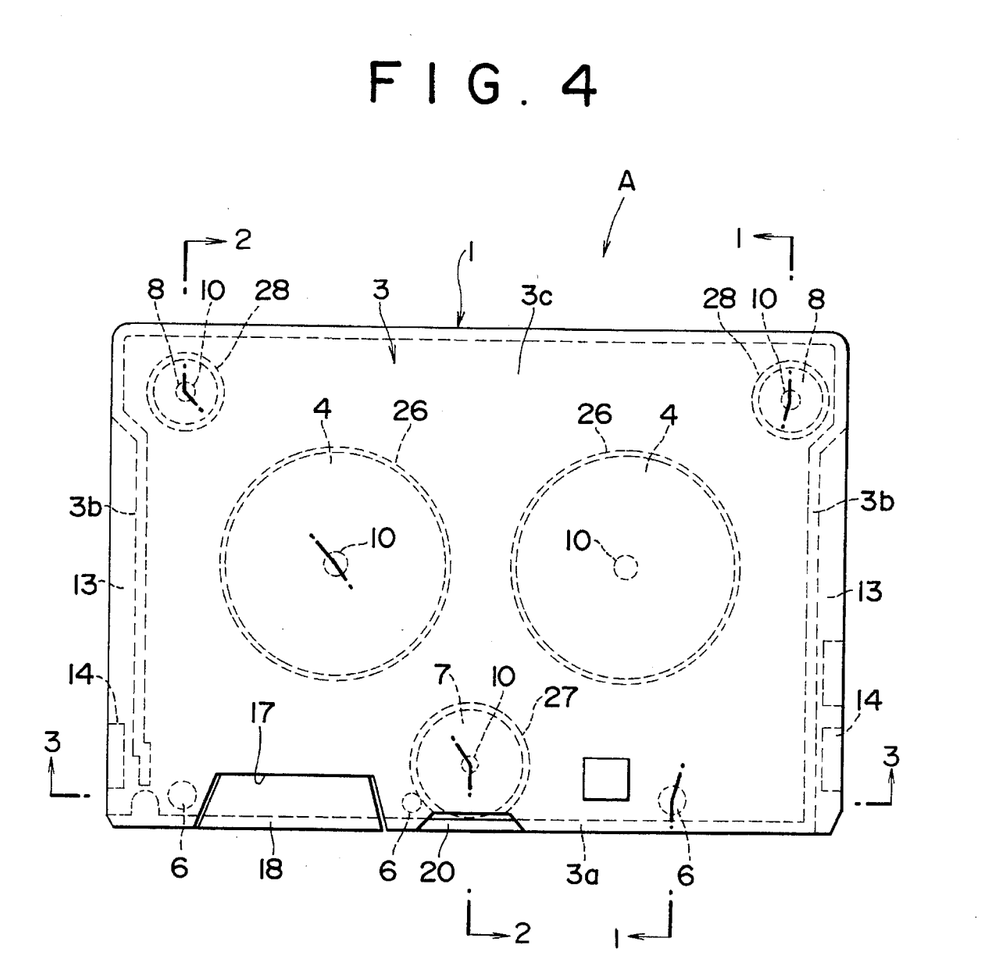
FIG. 4 is a plan view of the data cartridge according to the embodiment of the present invention represented in FIGS. 1A and 1B.

As shown in FIGS. 2 to 4, the cartridge case 1 of the data cartridge consists of a base plate 2 and a case body 3 having the shape of a shallow box and joined to the base plate 2. As best shown in FIG. 4, pair of circular recesses 26 having a diameter slightly greater than those of the upper flanges 4a of a pair of tape reels 4, a circular recess 27 having a diameter slightly greater than the diameter of the upper flange 7b of a driving roller 7, and a pair of circular recesses 28 having a diameter greater than that of guide rollers 8 are formed in the lower surface of the upper wall 3c of the case body 3 respectively at positions corresponding to the tape reels 4, the driving roller 7 and the guide rollers 8.

The upper flanges 4a of the tape reels 4 are fitted partly in the circular recesses 26. Pivots 4c coaxial with the flanges 4b are pressed resiliently against the bottom surfaces 26a of the circular recesses 26 by the resilience of the upper flanges 4a. The pivots 4c are positioned correctly by positioning projections 23 formed integrally with the upper wall 3c of the case body 3 and coaxially with the circular recesses 26 on the bottom surface 26a of the circular recesses 26.

The upper flange 7b of the driving roller 7, and the upper ends of the guide rollers 8 are fitted in the circular recesses 27 and 28, respectively. The upper boss 7c of the driving roller 7 and the upper bosses 8b of the guide rollers 8 are in pressure-contact with cylindrical projections 24 formed integrally with the upper wall 3c of the case body 3 at the centers of the circular recesses 27 and 28, respectively, so that the driving roller 7 and the guide rollers 8 mounted on shafts 10 are pressed against the base plate 2.

Although the overall dimensions X, Y and Z, and the height H of the internal space of the cartridge case 1 are equal to those of the cartridge case of the data cartridge provided with the a ¼ in. magnetic tape, respectively, the height $B_1$ of the lower surface of the upper flanges 4a of the tape reels 4 of this data cartridge is greater than the height $A_1$ of the upper flanges 4a of the tape reels 4 of the known data cartridge provided with a ¼ in. magnetic tape in FIG. 8, and the height of the upper surfaces of the lower flanges 4b of the tape reels 4 of this data cartridge is equal to the height of the upper surfaces of the lower flanges 4b of the tape reels 4 of the data cartridge provided with a ¼ in.

magnetic tape. Accordingly, in the cartridge of FIGS. 2 and 3, the distance between the lower surface of the upper flange 4a and the upper surface of the lower flange 4b, which corresponds to the width of the magnetic tape, of the tape reel 4 is greater than the distance between the lower surface of the upper flange 4a and the upper surface of the lower flange 4b, which corresponds to the width of a ¼ in. magnetic tape, of the tape reels 4 of the data cartridge provided with a ¼ in. magnetic tape.

Thus, the cartridge case 1 of the data cartridge shown in FIGS. 2–4 is applicable to both the S-type data cartridge containing a ¼ in. magnetic tape and the L-type data cartridge containing an 8 mm magnetic tape, the recording capacity of which is about 1.25 times that of the ¼ in. magnetic tape of the same length.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. In a data storage cartridge comprising a base plate and a case body joined to each other to form a cartridge case having substantially parallel front and back sides; a pair of tape reels rotatably mounted in side-by-side relation within said cartridge case with axes of rotation of said reels being situated approximately on a median of said cartridge case which is parallel to said front and back sides of the latter; a magnetic tape coiled on said reels and selectively having either a first width or a second width different from said first width; a driving roller rotatably mounted in said cartridge case adjacent said front side at a mid-position relative to said reels; a pair of guide rollers rotatably mounted in said cartridge case adjacent opposite ends of said back side of the latter; and a driving belt wound around said driving roller and said guide rollers so as to travel along a substantially T-shaped path including portions where said driving belt is pressed into contact with coils of said magnetic tape coiled on the pair of tape reels for driving the tape and rotating the tape reels in response to rotation of said driving roller: the improvement comprising each of said guide rollers including a crowned peripheral working surface in contact with said driving belt, said crowned peripheral working surface extending axially at least partly between opposite ends of the respective guide roller and having a maximum diameter at an axial position that deviates from a mid-position between said opposite ends of the respective guide roller in a direction toward one of said ends of said respective guide roller, each of said guide rollers being disposed in said cartridge case in a first orientation in which said one end of the respective guide roller faces toward said base plate when said magnetic tape has said first width, and each of said guide rollers being disposed in said cartridge case in a second orientation in which said one end of the respective guide roller faces away from said base plate when said magnetic tape has said second width.

2. A data storage cartridge according to claim 1; in which said first width is smaller than said second width.

3. A data storage cartridge according to claim 2; further comprising flanged tape guides in said cartridge case for positioning said tape having either said first width or said second width at the same distance from said base plate so that, when said tape has said first width, the longitudinal median of the tape is positioned at a first distance from the position of the longitudinal median of the tape when the latter has said second width, said first distance being approximately one-half the difference between said second and first widths; and in which said position of the maximum diameter of said crowned working surface of each of said guide rollers deviates from said mid-position between the ends of the respective guide roller by a second distance equal to approximately one-half of said first distance.

\* \* \* \* \*